United States Patent [19]

Paul et al.

[11] Patent Number: 4,732,949

[45] Date of Patent: Mar. 22, 1988

[54] POLYDIORGANOSILOXANE/POLYCARBONATE BLOCK COPOLYMERS

[75] Inventors: Winfried Paul; Werner Nouvertné, both of Krefeld, Fed. Rep. of Germany; Hartmut Löwer; Mark W. Witman, both of Pittsburgh, Pa.; Ulrich Grigo, Kempen, Fed. Rep. of Germany

[73] Assignee: Bayer Aktiengesellschaft, Leverkusen, Fed. Rep. of Germany

[21] Appl. No.: 828,470

[22] Filed: Feb. 12, 1986

[30] Foreign Application Priority Data

Feb. 23, 1985 [DE] Fed. Rep. of Germany ....... 3506472

[51] Int. Cl.$^4$ ............................................. C08F 283/02
[52] U.S. Cl. .................................... 525/464; 525/474; 528/25; 528/29
[58] Field of Search .................. 525/474, 464; 528/25, 528/29

[56] References Cited

U.S. PATENT DOCUMENTS

| | | | |
|---|---|---|---|
| 2,999,846 | 9/1961 | Schnell et al. | 260/49 |
| 3,189,662 | 6/1965 | Vaughan | 260/824 |
| 3,271,367 | 9/1966 | Schnell et al. | 260/49 |
| 3,419,634 | 12/1968 | Vaughan | 260/824 |
| 3,525,712 | 8/1970 | Kramer | 260/47 |
| 3,544,514 | 12/1970 | Schnell et al. | 260/47 |
| 3,879,347 | 4/1975 | Serini et al. | 260/47 |
| 3,879,348 | 4/1975 | Serini et al. | 260/47 |
| 4,161,469 | 7/1979 | LeGrand et al. | 260/40 |
| 4,161,498 | 7/1979 | Bopp | 525/439 |
| 4,269,964 | 5/1981 | Freitag | 528/126 |
| 4,569,970 | 2/1986 | Paul et al. | 525/67 |
| 4,584,360 | 4/1986 | Paul et al. | 528/14 |
| 4,600,632 | 7/1986 | Paul et al. | 428/220 |

FOREIGN PATENT DOCUMENTS

| | | |
|---|---|---|
| 0162245 | 4/1985 | European Pat. Off. . |
| 3334782 | 10/1984 | Fed. Rep. of Germany . |
| 51-34992 | 9/1976 | Japan . |
| 133149 | 8/1982 | Japan . |

OTHER PUBLICATIONS

Chemistry and Physics of Polycarbonates by Hermann Schnell, Interscience Publishers, 1964, pp. 31–41.
Polycarbonates, by William F. Christopher and Daniel W. Fox, Reinhold Publishing Corporation, New York, 1962, at pp. 15–18.

Primary Examiner—Melvyn I. Marquis
Attorney, Agent, or Firm—Gene Harsh; Joseph C. Gil; Aron Preis

[57] ABSTRACT

The present invention relates to the preparation of thermoplastic poly-(diorganosiloxane)/polycarbonate block copolymers containing monoalkylphenyl or dialkylphenyl end groups by the phase boundary process, and to the block copolymers which can be obtained by the process.

8 Claims, No Drawings

POLYDIORGANOSILOXANE/POLYCARBONATE BLOCK COPOLYMERS

The present invention relates to the preparation of thermoplastic poly-(diorganosiloxane)/polycarbonate block copolymers having mean molecular weights $\overline{M}w$ (weight average) of about 10,000 to 30,000, preferably about 15,000 to 25,000 (determined in a known manner by ultracentrifugation or measurement by light scattering) and having a content of poly-(diorganosiloxane) structural units of between 10% by weight and 0.5% by weight, preferably between 7% by weight and 1% by weight, relative in each case to the total weight of the block copolymer, the poly-(diorganosiloxane) structures having a degree of polymerisation of between 5 and 100, preferably between 20 and 80, from (a) α,ω-bis-hydroxyaryloxy polydiorganosiloxanes having degrees of polymerisation of between 5 and 100, preferably between 20 and 80, preferably those of the formula (I),
(b) other diphenols, preferably of the formula (II),
(c) chain stoppers and, if appropriate,
(d) chain-branching agents, by the known methods of the two-phase boundary process using phosgene, which is characterised in that the chain stoppers employed are monoalkylphenols or dialkylphenols containing a total of 8 to 20 C atoms in the alkyl substituents, preferably those of the formula (III)

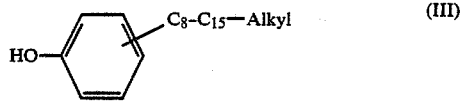

in adequate amounts, preferably amounts of 1.0 mol% to 10 mol%, relative to the diphenols of the component (b) employed, quantitative reaction of the phenolic components being obtained.

The present invention also relates to the block copolymers containing monoalkylphenyl or dialkylphenyl end groups which can be obtained by the process according to the invention.

These products have an improved mould release and flow behaviour and a tough-brittle transition which has been displaced towards lower temperatures.

Polydiorganosiloxane/polycarbonate block copolymers are known from the literature (see, for example, U.S. Pat. Nos. 3,189,662, 3,419,634, DE-OS (German Published Specification) No. 3,334,782 (Le A No. 22,594) or EP No. 0,122,535 (Le A No. 22,594-EP).

Polycarbonates having alkylphenyl end groups have also been disclosed in JA-OS (Japanese Published Specification) No. 34,992/76, DE-OS (German Published Specification) No. 2,842,005 (Le A No. 19,006) and JA-OS (Japanese Published Specification) No. 133,149/82.

It was not obvious that the use of such end groups in the polydiorganosiloxane block copolycarbonates would cause such an improvement in the toughness at low temperatures and at large specimen thicknesses or specimen widths compared with, for example, the bisphenol A polycarbonates containing alkylphenyl end groups mentioned above. It was also surprising that this toughness of the block copolymers at low temperatures should also be improved compared with the known polydiorganosiloxane/polycarbonate block copolymers containing, for example, phenyl end groups.

α,ω-Bis-hydroxyaryloxypolydiorganosiloxanes according to component (a) to be employed in accordance with the invention are disclosed, for example, in U.S. Pat. No. 3,419,634.

Polydiorganosiloxanes containing α,ω-bis-hydroxyaryloxy end groups to be employed preferentially are those of the formula (I)

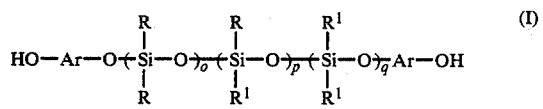

wherein the
Ar are identical or different arylene radicals from diphenols preferably containing 6 to 30 C atoms and
R and $R^1$ are identical or different and denote linear alkyl, branched alkyl, halogenated linear alkyl, halogenated branched alkyl, aryl or halogenated aryl, preferably methyl,
and the number of diorganosiloxy units $n=o+p+q$ is 5 to 100, preferably 20 to 80.

In formula (I) above, alkyl is, for example, $C_1$-$C_{20}$-alkyl; aryl in formula (I) above is $C_6$-$C_{14}$-aryl. In formula I above, halogenated denotes partially or completely chlorinated, brominated or fluorinated. Examples of alkyl, aryl, halogenated alkyl and halogenated aryl groups are methyl, ethyl, propyl, n-butyl, tert.-butyl, phenyl, naphthyl, chloromethyl and trifluoropropyl.

The following are diphenols which can be employed for the preparation of the α,ω-bis-hydroxyaryloxypolydiorganosiloxanes according to component (a), preferably of the formula (I) to be employed in accordance with the invention: Hydroquinone, resorcinol, dihydroxybiphenyls, bis-(hydroxyphenyl)-alkanes, bis-(hydroxyphenyl)-cycloalkanes, bis(hydroxyphenyl) sulphides, bis-(hydroxyphenyl) ethers, bis(hydroxyphenyl) sulfoxides, bis-(hydroxyphenyl) sulphones and α,α-bis-(hydroxyphenyl)-diisopropylbenzenes and also compounds thereof which are alkylated in the nucleus and halogenated in the nucleus. These and further suitable aromatic dihydroxy compounds are listed, for example, in U.S. Pat. Nos. 3,271,367 and 2,999,846 and in German Offenlegungsschriften Nos. 2,063,050 and 2,211,957.

Diphenols which are preferentially suitable for the preparation of the α,ω-bis-hydroxyaryloxydiorganosiloxanes according to component (a) are those of the formula (II)

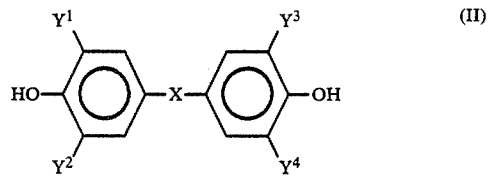

wherein
X is a single bond, —$CH_2$—,

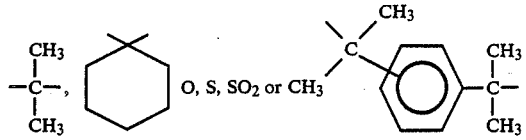

$Y^1$ to $Y^4$ are identical or different and denote hydrogen, $C_1$–$C_4$-alkyl, preferably methyl, or halogen, preferably chlorine or bromine.

The following are examples of preferred diphenols: 2,2-bis-(4-hydroxyphenyl)-propane, 1,1-bis-(4-hydroxyphenyl)-cyclohexane, 2,2-bis-(3,5-dichloro-4-hydroxyphenyl)-propane, 2,2-bis-(3,5-dibromo-4-hydroxyphenyl)propane, 2,2-bis-(3,5-dimethyl-4-hydroxyphenyl)-propane, bis-(3,5-dimethyl-4-hydroxyphenyl)-methane and bis-(4-hydroxyphenyl) sulphide.

Other diphenols according to component (b) which can be employed in accordance with the invention are those listed above, preferred representatives in turn corresponding to the formula (II).

Monoalkylphenols or dialkylphenols which are suitable in accordance with the invention can contain linear alkyl radicals and branched alkyl radicals. Examples of the chain stoppers according to component (c) which can be used in accordance with the invention are p-isooctylphenol, p-nonylphenol, 3,4-di-tert.-butylphenol, p-tert.-octylphenol, p-dodecylphenol, 2-(3,5-dimethylheptyl)-phenol and 4-(3,5-dimethylheptyl)-phenol.

Instead of the monoalkylphenols or dialkylphenols, it is also possible to employ halogenocarbonic acid esters thereof.

Chain-branching agents according to component (d) which can be employed are those having three or more than three functional groups, in particular those having three or more than three phenolic hydroxyl groups, it being necessary to adhere to the customarily known amounts of chain-branching agent between 0.05 and 2 mol%, relative to diphenols of the component (b). The preparation of branched polycarbonates is described, for example, in DT-OS (German Published Specification) No. 1,570,533 and DT-OS (German Published Specification) No. 1,595,762 and in U.S. Pat. No. 3,544,514.

Examples of some of the compounds having three or more than three phenolic hydroxyl groups which can be used are: 2,4-bis-(4-hydroxyphenylisopropyl)-phenol, 2,6-bis-(2'-hydroxy-5'-methylbenzyl)-4-methylphenol, 2-(4-hydroxyphenyl)-2-(2,4-dihydroxyphenyl)-propane and 1,4-bis-(4,4'-dihydroxytriphenylmethyl)-benzene. Some of the other trifunctional compounds are: 2,4-dihydroxybenzoic acid, trimesic acid, cyanuric chloride and 3,3-bis-(4-hydroxyphenyl)-2-oxo-2,3-dihydroindole and also 3,3-bis-(4-hydroxy-3-methylphenyl)-2-oxo-2,3-dihydroindole.

The polydiorganosiloxanes containing $\alpha,\omega$-bis-hydroxyaryloxy end groups and the chain stoppers can be added, in the two-phase boundary process, together with the other diphenols according to component (b) before the introduction of phosgene or separately during or after the introduction of phosgene, but in every case before the addition of the polycondensation catalyst.

Organic solvents which are suitable for the two-phase boundary process are those which are known for thermoplastic polycarbonates, such as, for example, methylene chloride or chlorobenzene.

Basic compounds suitable for the formation of the aqueous alkaline phase are solutions of LiOH, NaOH, KOH, Ca(OH)$_2$ and/or Ba(OH)$_2$ in water.

Catalysts suitable for the polycondensation by the two-phase boundary process are the tertiary aliphatic amine catalysts which are known for the synthesis of polycarbonates, such as trimethylamine, triethylamine, n-tripropylamine, n-tributylamine or N-ethylpiperidine; if desired, it is also possible to employ the known quaternary ammonium salts, such as, for example, tetrabutylammonium bromide.

Depending on the diphenol employed, the amount of catalyst for the two-phase boundary process varies between 0.2 and 5 mol%, or, if tetramethyl-substituted diphenols are employed, between 5 and 10 mol%, relative in each case to the total amount of diphenols according to component (b) employed.

The amounts of the organic phase are preferably so chosen that the two-phase boundary polycondensation is carried out with a 5 to 20% strength organic solution, preferably a 10 to 15% strength organic solution.

In the preparation by the two-phase boundary process, the amounts of aqueous alkaline phase are preferably equal in terms of volume to the amount of the whole organic phase. They can also be greater or less in terms of volume than the total amounts of the organic phase.

The pH of the aqueous phase during the reaction is between pH 9 and 14, preferably between pH 12 and 13.

The proportions of the reactants, of another diphenol according to component (b) in relation to a hydroxyaryloxy-terminated polydiorganosiloxane according to component (a), to be employed in each case depend on the content of poly-(diorganosiloxane) units to be achieved in the block copolymer to be prepared in accordance with the invention, quantitative conversion of the reactants normally being obtained.

The carbonate donors which are used in a known manner for the preparation, according to the invention, by the two-phase boundary process are carbonyl halides, in particular carbonyl chlorides, such as, for example, phosgene or COBr$_2$, or the bis-chlorocarbonic acid esters of diphenols in an appropriate amount, less than ½ mole of diphenol being used in each case per halogenocarbonic acid group.

The aromatic, thermoplastic block copolymers according to the invention can be isolated by the method known from synthesis of polycarbonates by the two-phase boundary process. In this method, the organic phase containing the copolycarbonate in solution is separated off and washed, and the copolycarbonate is then isolated by evaporating the solution, an evaporation extruder preferably being used as the final stage of the working up process.

Customary additives can be added to the block copolymers obtainable in accordance with the invention before, during or after the preparation of the latter. Examples which may be mentioned in this connection are dyestuffs, pigments, stabilisers against the action of moisture, heat and UV radiation, fillers, such as glass powder, quartz products, graphite, molybdenum sulphide, metal powders and glass fibres.

The block copolymers according to the invention can be employed in all cases where the known aromatic polycarbonates have hitherto been used and where, in addition, good flow coupled with an improved mould release behaviour and high toughness at low temperatures is required, as, for example, for the preparation of large external components of motor vehicles or switch cases for outdoor use.

EXAMPLES

Determination of the siloxane content, that is to say the proportion of dimethylsiloxane units, in % by weight, relative to the total weight of the block copolymer, was carried out by nuclear magnetic resonance spectrometry. The degree of polymerisation $\bar{n}$ measured by determining the end groups on the polysiloxane starting material is quoted as the mean siloxane block length.

The relative solution viscosity was measured at 25° C. and at a concentration of 5 g/l in methylene dichloride.

The Izod notched impact strength was determined on test specimens of width 3.2 mm or 6.4 mm by a method modelled on ASTM D 256.

The heat distortion temperature was determined by the Vicat method (VST/B/120) as specified in DIN 53,460/ISO 368.

The mould release force was determined on a sleeve mould.

A. Preparation of alkylphenol-terminated polycarbonate

COMPARISON EXAMPLE 1

3.42 kg of bisphenol A, dissolved in 6.67 kg of 45% strength sodium hydroxide solution and 37.7 kg of water, are initially taken, at 20° C., together with 26.5 kg of methylene chloride and 22.1 kg of chlorobenzene. A solution of 154.7 g of 4-(1,1,3,3-tetramethylbutyl)phenol in 100 g of methylene chloride is added to the stirred mixture in the course of approx. 15 minutes with stirring, 2.23 kg of phosgene are then introduced in the course of 1 hour at 13°–14°and 21°–25° C. 15 g of triethylamine are then added and the mixture is stirred for a further 30 minutes.

The aqueous phase, free from bisphenolate, is separated off and the organic phase is acidified with phosphoric acid, washed with water until neutral and freed from solvent.

B. Preparation of polydimethylsiloxane containing bisphenol A end groups 19.2 parts by weight of bisphenol A and 1800 parts by weight of chlorobenzene are put into a vessel equipped with a condenser, a thermometer, a dropping funnel and a stirrer. The mixture is heated to 100° C. and 11.6 parts by weight of potassium carbonate are added. A solution of 178 parts by weight of α,ω-bis-acetoxypolydimethylsilaxane, $\bar{P}_n=84$, in 178 parts by weight of chlorobenzene is then added to the mixture, under reflux, over a period of 15 minutes, stirring being continued for 2 further hours. The mixture is cooled to about 80° C. and filtered while still hot.

C. Preparation of polydimethylsiloxane/polycarbonate block copolymers

COMPARISON EXAMPLE 2

3035 parts by weight of bisphenol A, 3034 parts by weight of sodium hydroxide, 34,700 parts by weight of water, 17,800 parts by weight of methylene dichloride and 13,100 parts by weight of chlorobenzene and 74.2 parts by weight of phenol are added to the solution, described under B, of polydimethylsiloxane containing bisphenol A end groups, in a reaction flask equipped with a stirrer, a phosgene inlet tube, a reflux condenser, an internal thermometer and a dropping funnel. 2216 parts by weight of phosgene are passed in at room temperature, the pH being kept between 12 and 13 by adding 45% strength sodium hydroxide solution. Passing in the phosgene requires approx. 1 hour. 11 parts by weight of triethylamine are then added and the mixture is stirred for a further 45 minutes at pH 12 to 13. The co-condensate is worked up by methods customary for polycarbonates.

EXAMPLE 3

(according to the invention)

3035 parts by weight of bisphenol A, 3024 parts by weight of sodium hydroxide, 34,700 parts by weight of water, 17,800 parts by weight of methylene dichloride and 13,100 parts by weight of chlorobenzene and 164.7 parts by weight of 4-(1,1,3,3-tetramethylbutyl)-phenol are added to the solution, described under B, of polydimethylsiloxane containing bisphenol A end groups, in a reaction flask equipped with a stirrer, a phosgene inlet tube, a reflux condenser, an internal thermometer and a dropping funnel. 2216 parts by weight of phosgene are passed in at room temperature, the pH being kept between 12 and 13 by adding 45% strength sodium hydroxide solution. Passing in the phosgene requires approx. 1 hour. 11 parts by weight of triethylamine are then added and the mixture is stirred for a further 45 minutes at pH 12 to 13. The cocondensate is worked up by methods customary for polycarbonates.

D. Comparison of properties in tabular form

| Properties | Comparison Example 1 | Comparison Example 2 | Example 3 |
|---|---|---|---|
| Relative solution viscosity | 1.228 | 1.223 | 1.200 |
| Siloxane content (%) | — | 4.8 | 5.3 |
| Siloxane block length (n) | — | 84 | 84 |
| Melt viscosity at 300° C./$10^3$ seconds$^{-1}$ Pa · s | 120 | 131 | 113 |
| Notched impact strength by Izod method (3.2 mm) | | | |
| at room temperature, J/m | 8 × 146/2 × 567* | 741* | 557* (*ductile fracture) |
| at −40 C., J/m | — | 9 × 495*/1 × 263 | 381* |
| critical temperature, °C. | Room temperature | −40 | less than −40 |
| Notched impact strength by Izod method (6.4 mm) | | | |
| at room temperature, J/m | — | — | 391* |
| at 0° C., J/m | — | — | 7 × 355*/3 × 320 |

D. Comparison of properties in tabular form

| Properties | Comparison Example 1 | Comparison Example 2 | Example 3 |
|---|---|---|---|
| critical temperature, °C. | above room temperature | above room temperature | 0 |
| Heat distortion point VST (BST/B/120), °C. | 140 | 141 | 141 |
| Mould release force at mould temperature of 136° C. and composition temperature of 300° C., bar | 20 | — | 5 |

We claim:

1. A process for the production of a thermoplastic poly-(diorganosiloxane)/polycarbonate block copolymer comprising reacting
   (a) α,ω-bis-hydroxyaryloxy polydiorganosiloxane having a degree of polymerization of between 5 and 100,
   (b) at least one other diphenol,
   (c) a chain stopper and, if desired,
   (d) a chain branching agent,
with phosgene in the two-phase boundary process characterized in that said chain stopper is a member selected from the group consisting of a monoalkylphenol, a halogenocarbonic acid ester of a monoalkyl phenol, a dialkylphenol and a halogenocrbonic acid ester of a dialkyl phenol wherein the alkyl substituents contain 8 to 20 carbon atoms and in that chain stopper is employed in a sufficient amount such that a quantitative reaction of the phenolic component is obtained, said copolymer being characterized in that its weight average molecular weight, determined by ultracentrifugation or by light scattering, is about 10,000 to 30,000 and in that it contains 0.5 to 10% by weight of poly-(diorganosiloxane) structural units.

2. A process according to claim 1, in which the chain stopper is a compound of the formula

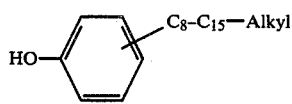

(III)

3. A process according to claim 1, in which the chain stoppers is employed in an amount of 1.0 mol% to 10 mol%, relative to diphenol(s) of the component (b) employed.

4. A process according to claim 1, in which component (a) is employed in an amount to give a content in the final block polymer of poly(diorganosiloxane) structural units of between 7% by weight and 1% by weight, relative in each base case to the total weight of the block copolymer.

5. A process according to claim 1, in which a α,ω-bis-hydroxyaryloxy polydiorganosiloxane having a degree of polymerisation between 20 and 80 is used as component (a).

6. A shaped article formed of the block copolymer of claim 1.

7. In the process for the preparation of a thermoplastic poly-(diorganosiloxane)/polycarbonate block copolymer in the two phase boundary process by reacting
   (a) α,ω-bis-hydroxyaryloxy polydiorganosiloxane having a degree of polymerization of between 5 and 100,
   (b) at least one other diphenol,
   (c) a chain stopper and, if desired,
   (d) a chain branching agent
with phosgen, said copolymer being characterized in that its weight average molecular weight determined by ultra-centrifugation or by light scattering is about 10,000 to 30,000 and in that it contains 0.5 to 10% by weight of poly-(diorganosiloxane) structural units, the improvement comprising using as a said chain stopper, a member selected from the group consisting of a monoalkylphenol, a halogenocarbonic acid ester of a monoalkylphenol, a dialkylphenol and a halogenocrbonic acid ester of a dialkylphenol wherein the alkyl substituents contain 8 to 20 carbon atoms, in a sufficient amount such that a quantitative reaction of the phenolic component is obtained.

8. The copolymer obtained by the process of claim 7.